(12) United States Patent
Sander et al.

(10) Patent No.: US 7,993,479 B2
(45) Date of Patent: Aug. 9, 2011

(54) METHOD FOR JOINING PRECURED OR CURED STRINGERS TO AT LEAST ONE STRUCTURAL COMPONENT OF AN AIRCRAFT OR SPACECRAFT

(75) Inventors: Peter Sander, Bremen (DE); Hans Marquardt, Fredensbeok (DE); Hauke Lengsfeld, Helmste (DE)

(73) Assignee: Airbus Deutschland GmbH, Hamburg (DE)

( * ) Notice: Subject to any disclaimer, the term of this patent is extended or adjusted under 35 U.S.C. 154(b) by 911 days.

(21) Appl. No.: 11/904,310

(22) Filed: Sep. 26, 2007

(65) Prior Publication Data
US 2008/0083494 A1 Apr. 10, 2008

Related U.S. Application Data

(60) Provisional application No. 60/847,555, filed on Sep. 27, 2006.

(51) Int. Cl.
*B29C 65/00* (2006.01)
*B32B 37/00* (2006.01)

(52) U.S. Cl. ............... 156/285; 156/307.1; 264/101; 264/571

(58) Field of Classification Search ........... 156/285, 156/286, 307.1, 307.7, 381, 382; 264/510, 264/257, 258, 10, 102, 571; 244/131
See application file for complete search history.

(56) References Cited

U.S. PATENT DOCUMENTS
5,593,633 A * 1/1997 Dull et al. .............. 264/510
2006/0049552 A1* 3/2006 Fish ...................... 264/571

FOREIGN PATENT DOCUMENTS
DE 26 42 523 A1 3/1978

OTHER PUBLICATIONS

Official Action corresponding to the German Patent Application No. 10 2006 045 635.1-22 dated May 7, 2008.
DE—Buch Grundlagen der Luftfahrzeugtechnik in Theorie und Praxis, Band I, Allgemeine Luftfahrttechnik, Verlag TÜV Rheinland GmbH, 1990.

* cited by examiner

Primary Examiner — John L Goff, II
(74) Attorney, Agent, or Firm — Jenkins, Wilson, Taylor & Hunt, P.A.

(57) ABSTRACT

The invention relates to a method for joining precured stringers to at least one structural component of an aircraft or spacecraft. A vacuum arrangement necessary for the joining is produced in two parts. In a first step, each precured stringer is covered in advance with a covering vacuum film. The stringers prepared in this manner are arranged on the structural component. Respective vacuum film strips are subsequently arranged on adjacent stringers and over an intermediate space between the adjacent stringers. With the use of a vacuum sealing means, the vacuum film strips and the covering vacuum films 8 form a continuous vacuum arrangement. The stringers are subsequently joined under pressurization to the structural component with the use of this vacuum arrangement.

9 Claims, 2 Drawing Sheets

METHOD FOR JOINING PRECURED OR CURED STRINGERS TO AT LEAST ONE STRUCTURAL COMPONENT OF AN AIRCRAFT OR SPACECRAFT

CROSS-REFERENCE TO RELATED APPLICATIONS

This application claims the benefit of U.S. Provisional Application No. 60/847,555, filed Sep. 27, 2006, the entire disclosures of which are herein incorporated by reference.

FIELD OF THE INVENTION

The present invention relates to a method for joining precured or cured stringers to at least one structural component of an aircraft or spacecraft.

BACKGROUND OF THE INVENTION

A problem on which the invention is based is explained below with reference to the production of a rudder unit for an aircraft. However, this is not to be considered as a limitation for the method according to the invention which can be used in general for joining stringers to structural components.

The surface of a rudder unit of an aircraft is formed essentially by panel elements. Supporting stringers which impart the necessary rigidity to the rudder unit and which connect the individual panel elements to one another are arranged within the rudder unit. The stringers are typically formed by "I-shaped stringers".

For the production of a rudder unit which may be produced entirely from fiber composite materials, in particular the outer panel elements and the inner I-shaped stringers, suitable methods are required to ensure that the I-shaped stringers are joined to the panel elements.

A method known to the applicant makes provision to supply the panel elements in the form of un-impregnated semi-finished fiber products. The I-shaped stringers are arranged on the panel elements. The semifinished fiber product of the panel elements is then impregnated by means of an injection method. The stringers resting on the surface of the panel elements are wetted in the process by the resin and stuck on.

However, the following has proved disadvantageous in this case. The injection method requires a vacuum film to be arranged with a positive fit on the surface of the panel element and the I-shaped stringers. Laying the vacuum film with a positive fit along the step which is formed by the I-shaped stringer resting on said surface and the panel elements is complicated. This is because, inter alia, the step has a low height corresponding to the wall thickness of the I-shaped stringers. For conventional mechanical film laying apparatuses, this height is not sufficient in order to press the film onto the vertical profile of the step. Consequently, the covered vacuum films require at east one complicated manual finishing operation.

SUMMARY OF THE INVENTION

An object of the present invention consequently lies in simplifying the method for joining stringers to a structural component and in removing the abovementioned disadvantages.

The methods according to the invention which achieve this object provide simplified methods for joining precured or cured stringers to at least one structural component of an aircraft or spacecraft.

In one aspect of the invention, a required vacuum arrangement for the joining operation is formed in two steps.

In a first step, a first section of the required vacuum arrangement is formed by covering vacuum films. The latter each match the contour or the cross section of the individual stringers. As a rule, only a few different forms of stringers are used. Specialized methods or apparatuses which fit the covering vacuum films to the stringer with a positive fit can therefore be provided for these few forms.

In a second step, a second section of the vacuum arrangement is realized by vacuum film strips. The vacuum film strips advantageously only connect edge regions of two adjacent stringers to each other, with an intermediate space situated in between being spanned by the vacuum film strips.

The vacuum film strips therefore essentially cover only a planar region of the structural component. Furthermore, the vacuum film strips may rest on the vacuum sealing means in the edge region of the stringer and therefore can be moved or displaced at least to a small extent in relation to the covering vacuum film without mechanical stresses occurring in the vacuum film strips. This can be used in the automated laying of the vacuum film strips. The vacuum film strips can also be matched to profiles having low height differences without great pressure, for example by means of flexibly mounted rollers or brushes, with the covering vacuum films advantageously not being displaced, stretched or changed in their arrangement or shape in another manner.

A second configuration of the method according to the invention makes provision to completely cure the stringers before they are arranged on the structural component, as a result of which they themselves form part of the required vacuum arrangement. Only the vacuum film strips are therefore necessary in order to cover the intermediate spaces between the stringers and therefore in order to supply the closed vacuum arrangement. The measure of using the vacuum film strips to span the intermediate spaces corresponds to the concept of the first configuration—accordingly, the same advantageous properties in terms of the method are produced.

According to one embodiment, at least two stringers are arranged parallel to each other on the structural component.

A development makes provision to arrange a flow fabric in the intermediate space before the vacuum film strip is deposited and pressed on. The flow fabric serves for the improved transportation of resins as matrix for the structural component. In addition, the flow fabric can be adapted in its height in such a manner that the vacuum film strips come to lie on a flat plane. For this purpose, the thickness of the flow fabric can correspond to the vertical distance of the supporting point of the vacuum sealing means from the surface of the structural component.

In another embodiment, the vacuum sealing means is deposited on at least one of the vacuum film strips in order to form a preassembled vacuum film strip, and the preassembled vacuum film strip is subsequently deposited on the structural component and pressed on. In an alternative refinement, the vacuum sealing means is first of all deposited on predetermined sections of the stringers or of the covering vacuum films which are already provided, and the vacuum film strips are subsequently deposited.

According to a further exemplary embodiment, the depositing of the covering vacuum film on the stringer is integrated in the production method of the stringer. The production method can be, inter alia, an extrusion method or drawing method (extrusion or pultrusion method). At the same time as the method, the covering vacuum film can be deposited as the outermost layer by means of the moulds used, which provide the stringer with its shape. This ensures that the covering vacuum film bears against the stringer with a positive fit. A supporting surface of the stringer, which surface is used later on, preferably remains free from covering vacuum film, or the covering vacuum film is to be removed from the supporting surface.

According to a further embodiment, the stringer has a stringer web and a stringer base. The covering vacuum film is deposited in advance on the stringer web and at least on an upper side of the stringer base. The vacuum film strips are pressed on typically on the upper side of the stringer base.

The stringers may be T-shaped stringers and/or I-shaped stringers. Other cross-sectional shapes and profiles are likewise possible. The stringers and/or the structural component can advantageously be produced from a fiber composite material. In particular, the stringers can be preimpregnated and precured. The structural component is advantageously not precured and, particularly preferably, also not impregnated with a resin.

BRIEF DESCRIPTION OF THE DRAWINGS

The present invention is explained in more detail below using preferred exemplary embodiments and with reference to the attached figures of the drawings, in which.

In the figures, the same reference numbers refer to identical or functionally identical components unless otherwise stated.

DETAILED DESCRIPTION OF THE INVENTION

A first embodiment of a method for joining stringers to a structural component is explained in more detail with reference to the cross sections in FIGS. 1 to 3.

Figure 1:
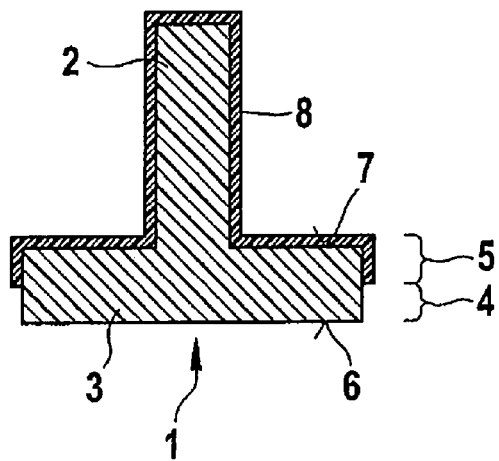
FIG. 1 shows a schematic illustration of a method step of a joining method according to one exemplary embodiment of the present invention.

FIG. 1 shows, in cross section, an example of a stringer 1 in the form of a T-shaped stringer for aircraft construction. The stringer 1 is typically produced from a fiber composite material. The production can take place by means of a pultrusion method or other suitable methods. According to this exemplary embodiment, the stringer 1 is precured and therefore has a low, but sufficient mechanical rigidity such that its cross section is not deformed at least under its own weight.

Accordingly, the present stringer 1 has, in cross section, a stringer web 2 and a stringer base 3 projecting laterally therefrom on both sides. The stringer base 3 can be divided into a lower region 4 and an upper region 5. The lower side 6 of the stringer base 3 serves as a joining section for joining to a structural component 10. The above configuration of the stringer base 3 ensures that at least part of the upper side 7 of the stringer base 3 is not covered by the stringer web 2. The T-shape of the stringer 1 is merely one variant of a number of possible profile cross sections.

A covering vacuum film 8 is advantageously deposited with a positive fit onto the stringer web 2 of the stringer 1 and at least partially onto the upper side 7. This can already take place, for example, during the pultrusion method. In the pultrusion method and other production methods, the shape of the stringer 1 is predetermined by a pressing mould. The covering vacuum film 8 can expediently be introduced together with the soft, impregnated semifinished product into the pressing mould in order to ensure that the covering vacuum film 8 bears against the stringer web 2 has a positive fit.

Figure 2:
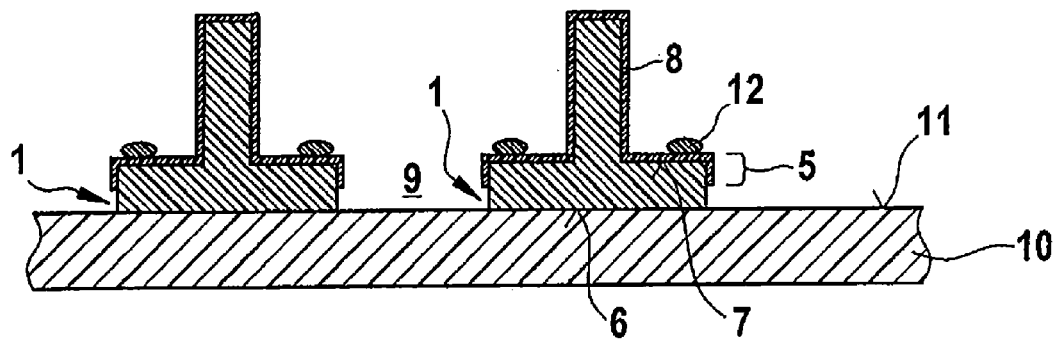
FIG. 2 shows a schematic illustration of a further method step of the joining method from FIG. 1.
Figure 3:
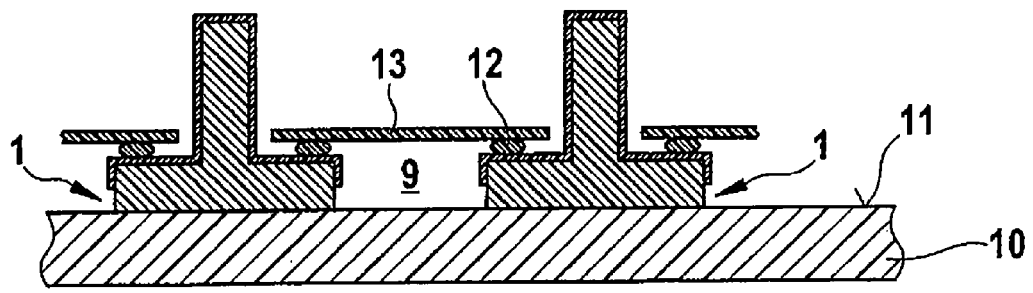
FIG. 3 shows a schematic illustration of a further method step of the joining method from FIGS. 1 and 2.

The stringer 1 with the covering vacuum film 8 laid on it is arranged together with the other stringers 1 on an associated structural component 10 and, for example, on the surface 11 thereof (FIG. 2). Gaps or intermediate spaces 9 are generally provided between the stringers 1. The structural component 10 is typically configured in a sheetlike manner, for example as an outer panel of a tail unit. The stringers 1 can be arranged parallel to one another. However, the arrangement arises primarily in accordance with the requirements of the mechanical construction of a workpiece, for example the tail unit.

The structural component 10 is typically a semifinished product for a fiber composite material which still has to be impregnated with a resin and cured. The shape of the structural component 10 is predetermined by a tool, not illustrated.

The precured stringers 1 can typically still be deformed plastically such that they can match the surface contour of the structural component 10. In the case of completely planar structural components 10, the precured stringers 1 can also be of entirely rigid design.

According to one exemplary embodiment, a vacuum sealing means 12 is deposited on the upper side 7 of the stringers 1 or on the covering vacuum film deposited there. This may take place in an automated manner by means of a robot.

Vacuum film strips 13 are supplied subsequently. The shape or cut thereof advantageously corresponds to the dimensions of the intermediate spaces 9. In the case in which the stringers 1 are arranged parallel to one another, the vacuum film strips 13 are strips with a width identical to the distance between the stringer webs 2. However, vacuum film strips 13 can be used in diverse forms, for example trapezia and triangles. The vacuum film strips 13 are arranged on the upper surfaces 7 and the vacuum sealing means 12. The arrangement may take place by means of a laying robot.

The laying robot advantageously brushes the vacuum film strips 13 onto the surface 11 of the structural component 10 (not illustrated). The respectively laid vacuum film strips 13 can slide on the vacuum sealing means 12 and can match themselves to the stringer base 3 without building up an internal mechanical stress. It is therefore possible to apply the vacuum film strips 13 with a positive fit with little application of force. The vacuum film strip 13 can be matched, inter alia, by means of brushes guided in an automated manner to the differences in height which arise, for example, because of the projecting stringer base 3.

The covering films 8 and the vacuum film strips 13 form a continuous vacuum arrangement without cavities. The vacuum arrangement is used in a subsequent infusion method or injection method. In this case, the semifinished product of the structural component 10 is impregnated with a matrix, typically with a resin. The resin comes into contact with the stringers 1 and adhesively bonds them to the structural component 10.

In the process, the stringers 1 may be heated. Accordingly, the resin, which is in particular only precured, of the stringer 1 softens and likewise becomes sticky. By this means, the properties of adhesion of the stringers 1 on the structural component 10 can be improved.

Figure 4:
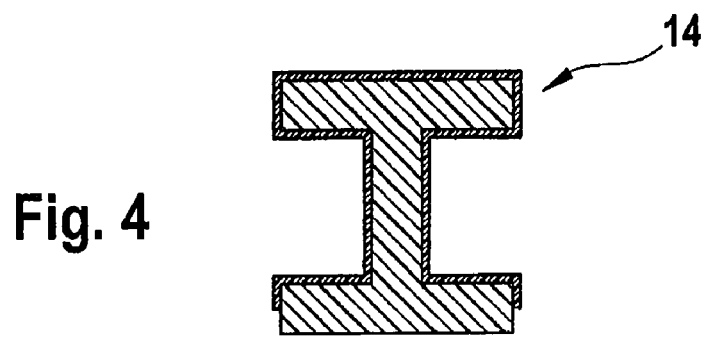
FIG. 4 shows a schematic illustration of a method step of a joining method according to a further preferred exemplary embodiment of the present invention.

FIG. 4 shows an I-shaped stringer 14 which can likewise be arranged in accordance with the above-described method on a structural component.

Figure 5:
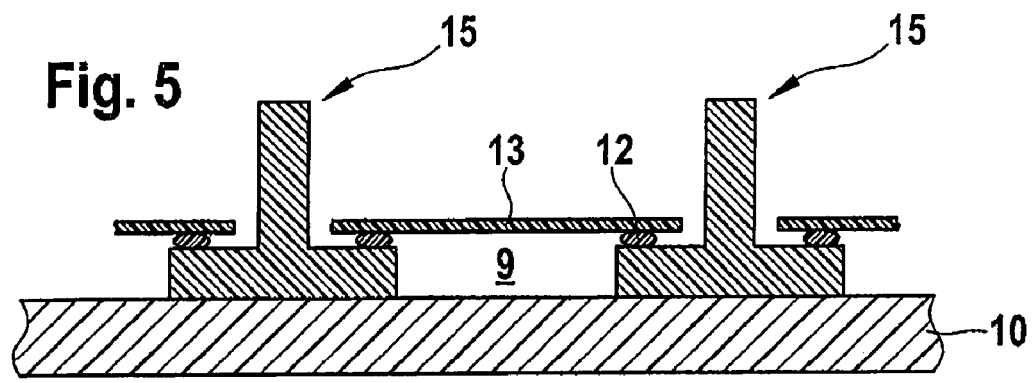
FIG. 5 shows a schematic illustration of a method step of a joining method according to a further preferred exemplary embodiment of the present invention.

A further embodiment of the joining method makes provision to use stringers 15 which are already cured (FIG. 5).

These stringers 15 are vacuumtight and can therefore form a section of the required vacuum arrangement. After the stringers 15 are arranged on the surface of the structural component 10, a vacuum sealing means 12 is deposited on the stringers 15. Vacuum films 13 are subsequently arranged, as per the description for FIG. 3, in such a manner that they are deposited on the vacuum sealing means 12 and span the intermediate spaces between the stringers 15. As a result, the cured stringers 15 and the vacuum films 13 form a vacuum arrangement for an injection method or an infusion method.

Figure 6:
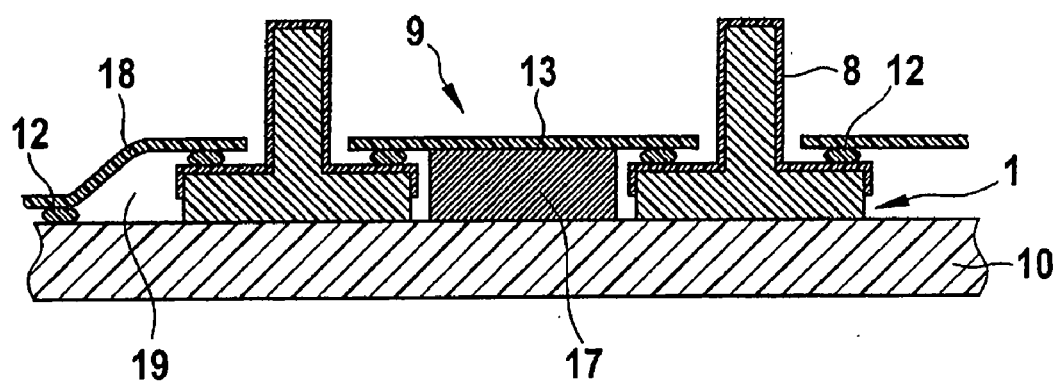
FIG. 6 shows a schematic illustration of a method step of a joining method according to a further preferred exemplary embodiment of the present invention.

In a further embodiment, a flow fabric 17 is arranged in the intermediate spaces 9 (FIG. 6). By this means, a more uniform distribution of a resin in the structural component 10 can be achieved. At the same time, the flow fabric 17 can mechanically support the vacuum film 13. In one particular variant, the flow fabric 17 has essentially the same dimensions as the intermediate spaces 9. The height or thickness of the flow fabric 7 is approximately identical to the height of the stringer base 3 of the stringer 1.

In the embodiments explained previously, a respective vacuum film is arranged between two adjacent stringers 1, i.e. is arranged such that it rests at least in some sections on the respective stringer bases 3. However, it is likewise possible, for example in the case of external stringers 1, to arrange a vacuum film 18 on the stringer base 3 of the stringer 1 and on the surface 11 of the structural component 10 (cf. FIG. 6). By this means, an intermediate space 19 is covered by the vacuum film 18, which intermediate space is adjacent to the stringer base 3 of the stringer 1. A vacuum sealing means 12 is to be fitted for this on the surface of the structural component in a suitable manner.

Although the present invention has been described with reference to preferred embodiments, it is not restricted to them but rather can be modified in diverse forms which are likewise encompassed by the claims.

For example, it is conceivable that the two method steps—depositing the vacuum sealing means and depositing the vacuum film strips—are replaced by a combination of these two process steps into one process step by means of a film covered with vacuum sealing means. All that, for example a robot, needs to do is correspondingly deposit the film which already has the sealing means. Similarly, the more substantial integration of the rest of the disposable construction, for example the tear-off fabric, the separating film, the air weave or the like is conceivable.

In particular, the present invention is not restricted to stringers with a T-profile but, inter alia, can also be used in the case of L-shaped stringers.

In summary, the invention relates, inter alia, to a method for joining precured stringers to at least one structural component of an aircraft or spacecraft. A vacuum arrangement necessary for the joining is produced in two parts. In a first step, each precured stringer 1 is covered in advance with a covering vacuum film 8. The stringers 1 prepared in this manner are arranged on the structural component 10. Respective vacuum film strips 13 are subsequently arranged on adjacent stringers 1 and over an intermediate space 9 between the adjacent stringers 1. With the use of a vacuum sealing means 12, the vacuum film strips 13 and the covering vacuum films 8 form a continuous vacuum arrangement. The stringers 1 are subsequently joined under pressurization to the structural component 10 with the use of this vacuum arrangement.

The present invention has, for example, the advantage that time-intensive processes to cover the entire component can be shortened. Furthermore, the entire method can be automated, thus reducing component errors due to working errors. Furthermore, automation permits the parameters of the essential steps of the production method to be able to be set in a specific manner and kept constant in order as already explained above, to reduce the manufacturing errors to a minimum.

In addition, the great flexibility of the method and the possibility for combinations provide a multiplicity of stringer variants such that a large part of possible requirements can be covered. Furthermore, the reduction in complexity means that the costs of the corresponding production methods are also considerably reduced.

What is claimed is:

1. A method for joining precured stringers to at least one structural component of an aircraft or spacecraft, comprising the following method steps:
   depositing covering vacuum films in advance at least on a predetermined region of each of the stringers to be joined;
   placing the stringers onto the at least one structural component;
   depositing and pressing respective vacuum film strips such that each strip is attached to the covering vacuum films on a pair of stringers and present between the pair of stringers with the use of vacuum sealing means in such a manner that a continuous vacuum arrangement, comprising the covering vacuum films and the vacuum film strips, is formed; and
   pressurized joining of the stringers to the at least one structural component by means of the continuous vacuum arrangement formed.

2. The method according to claim 1, wherein the pair of stringers is arranged with the stringers parallel to each other on the at least one structural component with an intermediate space being formed.

3. The method according to claim 2, wherein a flow fabric is arranged in the respective intermediate space before the respective vacuum film strip is deposited and pressed on.

4. The method according to claim 1, wherein the vacuum sealing means is deposited in advance onto the respective vacuum film strip in order to form a preassembled vacuum film strip, and the preassembled vacuum film strip is subsequently deposited on the structural component and pressed thereon.

5. The method according to claim 1, wherein, before the respective vacuum film strips are deposited and pressed on, the vacuum sealing means is deposited on the stringers to be joined or on predetermined regions of the coverings vacuum films which are already deposited.

6. The method according to claim 1, wherein the step of depositing the respective covering vacuum films on the stringers is integrated in the production method of the stringers.

7. The method according to claim 1, wherein the stringers are at least one of T-shaped stringers and I-shaped stringers.

8. The method according to claim 7, wherein the covering vacuum film is deposited in advance on a stringer web of each stringer and at least on an upper side of a stringer base of the stringer, and in that the vacuum film strips are each deposited on and pressed onto at least a section of the upper side of the stringer base.

9. The method according to claim 1, wherein at least one of the stringers and the at least one structural component is produced from a fiber composite material.

* * * * *

UNITED STATES PATENT AND TRADEMARK OFFICE
CERTIFICATE OF CORRECTION

PATENT NO. : 7,993,479 B2
APPLICATION NO. : 11/904310
DATED : August 9, 2011
INVENTOR(S) : Sander et al.

It is certified that error appears in the above-identified patent and that said Letters Patent is hereby corrected as shown below:

On title page, item (54) [title]

replace

"METHOD FOR JOINING PRECURED ~~OR CURED~~ STRINGERS TO AT LEAST ONE STRUCTURAL COMPONENT OF AN AIRCRAFT OR SPACECRAFT"

with

-- METHOD FOR JOINING PRECURED STRINGERS TO AT LEAST ONE STRUCTURAL COMPONENT OF AN AIRCRAFT OR SPACECRAFT --.

Under Column 1, line 9, please revise the paragraph as follows:

--This application claims the benefit of U.S. Provisional Application No. 60/847,555, filed Sep. 27, 2006, ~~the entire disclosures of~~ which ~~are herein~~ is incorporated herein by reference.--.

Under Column 1, line 16, please delete the words "~~or cured~~".

Under Column 1, line 27, please delete "~~elements. Supporting~~" and insert instead --elements, supporting--.

Under Column 1, line 65, please revise the paragraph as follows:

--The methods according to the invention which achieve this object and provide a simplified method[[s]] for joining precured ~~or cured~~ stringers to at least one structural component of an aircraft or spacecraft.--.

Under Column 2, line 42, please delete the words "~~development makes provision to arrange a~~"; and please insert --may be arranged-- after the words "flow fabric".

Signed and Sealed this
Seventeenth Day of July, 2012

David J. Kappos
*Director of the United States Patent and Trademark Office*

CERTIFICATE OF CORRECTION (continued)
U.S. Pat. No. 7,993,479 B2

Under Column 4, line 7, please insert the word --that-- after "vacuum film 8".

Under Column 4, line 21, please delete the "," after "tool" and insert --( )-- around "not illustrated" -- i.e., ""tool[[,]] (not illustrated)."

Under Column 4, line 44, please delete the word "themselves".

Under Column 4, line 59, please delete the words "of the stringer 1".

Under Column 5, line 16, please delete the word "variant" and insert the word --embodiment--.

Under Column 5, line 30, please delete the words "for this".

UNITED STATES PATENT AND TRADEMARK OFFICE
CERTIFICATE OF CORRECTION

PATENT NO. : 7,993,479 B2
APPLICATION NO. : 11/904310
DATED : August 9, 2011
INVENTOR(S) : Sander et al.

Page 1 of 2

It is certified that error appears in the above-identified patent and that said Letters Patent is hereby corrected as shown below:

On title page, item (54) and at Column 1, lines 1-4, [title]

replace

"METHOD FOR JOINING PRECURED ~~OR CURED~~ STRINGERS TO AT LEAST ONE STRUCTURAL COMPONENT OF AN AIRCRAFT OR SPACECRAFT"

with

--METHOD FOR JOINING PRECURED STRINGERS TO AT LEAST ONE STRUCTURAL COMPONENT OF AN AIRCRAFT OR SPACECRAFT--.

Under Column 1, line 9, please revise the paragraph as follows:

--This application claims the benefit of U.S. Provisional Application No. 60/847,555, filed Sep. 27, 2006, ~~the entire disclosures of~~ which ~~are herein~~ is incorporated herein by reference.--.

Under Column 1, line 16, please delete the words "~~or cured~~".

Under Column 1, line 27, please delete "~~elements. Supporting~~" and insert instead --elements, supporting--.

Under Column 1, line 65, please revise the paragraph as follows:

--The methods according to the invention which achieve this object and provide a simplified method[[s]] for joining precured ~~or cured~~ stringers to at least one structural component of an aircraft or spacecraft.--.

This certificate supersedes the Certificate of Correction issued July 17, 2012.

Signed and Sealed this
Fourteenth Day of August, 2012

David J. Kappos
*Director of the United States Patent and Trademark Office*

CERTIFICATE OF CORRECTION (continued)
U.S. Pat. No. 7,993,479 B2

Under Column 2, line 42, please delete the words "~~development makes provision to arrange a~~"; and please insert --may be arranged-- after the words "flow fabric".

Under Column 4, line 7, please insert the word --that-- after "vacuum film 8".

Under Column 4, line 21, please delete the "," after "tool" and insert --( )-- around "not illustrated" -- i.e., ""tool[[,]] (not illustrated)."

Under Column 4, line 44, please delete the word "~~themselves~~".

Under Column 4, line 59, please delete the words "~~of the stringer 1~~".

Under Column 5, line 16, please delete the word "~~variant~~" and insert the word --embodiment--.

Under Column 5, line 30, please delete the words "~~for this~~".